US012790926B2

(12) United States Patent
Navaiz et al.

(10) Patent No.: US 12,790,926 B2
(45) Date of Patent: Nov. 10, 2026

(54) DRILL SPACE UNIT DEVELOPMENT BASED ON ENERGY DELIVERED TO FORMATION

(71) Applicant: Halliburton Energy Services, Inc., Houston, TX (US)

(72) Inventors: Awais Navaiz, Denver, CO (US); Jon Preston Doucette, Denver, CO (US)

(73) Assignee: Halliburton Energy Services, Inc., Houston, TX (US)

( * ) Notice: Subject to any disclaimer, the term of this patent is extended or adjusted under 35 U.S.C. 154(b) by 517 days.

(21) Appl. No.: 18/495,572

(22) Filed: Oct. 26, 2023

(65) Prior Publication Data

US 2025/0137365 A1 May 1, 2025

(51) Int. Cl.

*E21B 43/26* (2006.01)
*G06Q 50/02* (2024.01)
*G01V 20/00* (2024.01)

(52) U.S. Cl.

CPC ............. *E21B 43/26* (2013.01); *G06Q 50/02* (2013.01); *E21B 2200/20* (2020.05); *G01D 2204/12* (2021.05); *G01V 20/00* (2024.01)

(58) Field of Classification Search

CPC ..... E21B 43/26; E21B 2200/20; G06Q 50/02; G01D 2204/12; G01V 20/00

See application file for complete search history.

(56) References Cited

U.S. PATENT DOCUMENTS 4,442,710 A * 4/1984 Meng .................... E21B 49/087
702/12
4,828,028 A 5/1989 Soliman
(Continued)

FOREIGN PATENT DOCUMENTS

CA 3086529 11/2022
CN 107939365 4/2018
(Continued)

OTHER PUBLICATIONS

J. Schatz et al., Multiple Radial Fracturing From a Wellbore Conceptual Model and Experiments, Jun. 23-25, 1986, The 27th U.S. Symposium on Rock Mechanics (USRMS), pp. 669-674 (Year: 1986).*

(Continued)

*Primary Examiner* — Mi'schita' Henson
(74) *Attorney, Agent, or Firm* — DeLizio, Peacock, Lewin and Guerra, LLP

(57) ABSTRACT

A hydraulic fracturing system and method uses an effective energy model to reflect energy loss in pressurized fracturing fluid passing into and through a wellbore to a reservoir formation during hydraulic fracturing. The model determines effective energy delivered to the reservoir formation as a function of surface energy added to the fracturing fluid to raise the fracturing fluid to a high-pressure state, gravitational potential energy gains in the pressurized fracturing fluid as the fluid travels down to the reservoir formation, and energy losses in the pressurized fracturing fluid as the fluid travels down to the reservoir formation. The effective energy model is applied to a selected reservoir formation and an operational cost for hydraulic fracturing of the selected reservoir formation is selected based on the effective energy model.

20 Claims, 7 Drawing Sheets

(56) References Cited

U.S. PATENT DOCUMENTS

| | | | |
|---|---|---|---|
| 4,938,286 A | 7/1990 | Jennings, Jr. | |
| 5,025,859 A | 6/1991 | Hanson et al. | |
| 7,146,704 B2 | 12/2006 | Otten et al. | |
| 9,982,523 B2 * | 5/2018 | Ciezobka | E21B 43/267 |
| 11,421,528 B2 | 8/2022 | Ruhle et al. | |
| 11,513,254 B2 | 11/2022 | Walles et al. | |
| 11,697,759 B1 | 7/2023 | Dusterhoft et al. | |
| 12,577,864 B2 | 3/2026 | Dusterhoft et al. | |
| 2003/0042018 A1 * | 3/2003 | Huh | E21B 43/2408 166/249 |
| 2003/0225522 A1 | 12/2003 | Poe | |
| 2007/0215345 A1 | 9/2007 | Lafferty et al. | |
| 2007/0272407 A1 | 11/2007 | Lehman et al. | |
| 2008/0234939 A1 | 9/2008 | Foot et al. | |
| 2010/0218941 A1 | 9/2010 | Ramurthy et al. | |
| 2011/0307227 A1 | 12/2011 | Poe | |
| 2012/0267104 A1 | 10/2012 | Clarkson et al. | |
| 2012/0303342 A1 | 11/2012 | Hazlett et al. | |
| 2013/0231910 A1 | 9/2013 | Kumar et al. | |
| 2013/0306315 A1 * | 11/2013 | Kaminsky | E21B 43/267 166/280.1 |
| 2014/0048270 A1 | 2/2014 | Soliman et al. | |
| 2015/0211347 A1 | 7/2015 | Snider et al. | |
| 2016/0138371 A1 | 5/2016 | Loaiza et al. | |
| 2017/0002652 A1 | 1/2017 | Kampfer et al. | |
| 2017/0058613 A1 | 3/2017 | Ling | |
| 2017/0089178 A1 * | 3/2017 | Schmidt | C02F 1/441 |
| 2017/0241251 A1 | 8/2017 | Rodrigues et al. | |
| 2018/0128091 A1 | 5/2018 | Harper | |
| 2018/0149000 A1 | 5/2018 | Roussel et al. | |
| 2018/0364381 A1 | 12/2018 | Raterman et al. | |
| 2019/0120022 A1 | 4/2019 | Zanon et al. | |
| 2019/0120044 A1 | 4/2019 | Langnes et al. | |
| 2019/0203574 A1 * | 7/2019 | Yi | E21B 43/11 |
| 2020/0225381 A1 | 7/2020 | Walles et al. | |
| 2020/0319077 A1 | 10/2020 | Moos et al. | |
| 2020/0340357 A1 | 10/2020 | Johnson | |
| 2021/0189874 A1 | 6/2021 | Jaaskelainen et al. | |
| 2021/0231835 A1 | 7/2021 | Ruhle et al. | |
| 2021/0256183 A1 | 8/2021 | Zhang et al. | |
| 2021/0364669 A1 | 11/2021 | Dusterhoft et al. | |
| 2022/0251942 A1 | 8/2022 | Cox et al. | |
| 2022/0325621 A1 | 10/2022 | Moos et al. | |
| 2022/0364943 A1 | 11/2022 | Sharma et al. | |
| 2023/0012783 A1 | 1/2023 | Jaaskelainen et al. | |
| 2023/0058311 A1 | 2/2023 | Haustveit et al. | |
| 2023/0058915 A1 | 2/2023 | Roussel et al. | |
| 2023/0147476 A1 * | 5/2023 | Wheelock | G01V 1/46 367/82 |
| 2024/0003235 A1 | 1/2024 | Bruns et al. | |
| 2024/0110472 A1 | 4/2024 | Xia et al. | |
| 2024/0410261 A1 | 12/2024 | Dusterhoft et al. | |
| 2024/0418412 A1 | 12/2024 | Barree et al. | |
| 2025/0020048 A1 | 1/2025 | Manchanda et al. | |
| 2025/0243750 A1 | 7/2025 | Dusterhoft et al. | |
| 2025/0257641 A1 | 8/2025 | Dusterhoft et al. | |
| 2026/0139576 A1 | 5/2026 | Dusterhoft et al. | |

FOREIGN PATENT DOCUMENTS

| | | |
|---|---|---|
| WO | 2023106954 | 6/2023 |
| WO | 2025090086 | 5/2025 |

OTHER PUBLICATIONS

G. J. Richards, Hydraulic Fracturing in Heterogenous Reservoirs; Modelling at Petrophysical vs. Geomechanical Resolution, Jun. 28-Jul. 1, 2000, 54th U.S. Rock Mechanics/Geomechanics Symposium, ARMA-2020-1842, pp. 1-17 (Year: 2000).*

R. Abedi, Mixed-Mode Dynamic Crack Propagation in Rocks With Contact-Separation Mode Transitions, Jun. 25, 2017, ARMA-2017-0679, Abstract only (Year: 2017).*

"U.S. Appl. No. 18/207,315 Final Office Action", Oct. 24, 2024, 24 pages.

"U.S. Appl. No. 18/207,315 Final Office Action", Jul. 28, 2025, 45 pages.

"U.S. Appl. No. 18/207,315 Non-Final Office Action", Feb. 26, 2025, 28 pages.

"U.S. Appl. No. 18/441,976 Non-Final Office Action", Jul. 28, 2025, 10 pages.

"PCT Application No. PCT/US2023/077980 International Search Report and Written Opinion", Jul. 22, 2024, 9 pages.

Brannon, et al., "Newest State of the Art Neutrally Buoyant Proppant Facilitates Placement Throughout Created Vertical Fractures to Provide Substantial Production Uplift in Unconventional Wells", Unconventional Resources Technology Conference, held in Houston, Texas, USA, Jul. 26-28, 2021., Jul. 2021, 21 pages.

Trumpener, "Significant back-to-back earthquakes in northern B.C. 'very likely' caused by fracking: federal expert.", CBC News, Nov. 8, 2022, www.cbc.ca/news/canada/british-columbia/northern-bc-fracking-earthquakes-november-2022-1.6654969., Nov. 2022, 6 pages.

Navaiz, et al., "Delineating and Quantifying the Hydraulic Fracturing Energy System", SPE Oklahoma City Oil and Gas Symposium, Apr. 2023, 10 pages.

"PCT Application No. PCT/US2025/010342 International Search Report and Written Opinion", Sep. 3, 2025, 9 pages.

"U.S. Appl. No. 18/980,815 Non-Final Office Action", Sep. 15, 2025, 12 pages.

"AU Application No. 2024201081, First Examination Report", Feb. 20, 2025, 6 pages.

"U.S. Appl. No. 18/207,315 Non-Final Office Action", Jun. 20, 2024, 27 pages.

Navaiz, et al., "Robust Correlation Between Effective Energy Injected and Total ProductionOutput: Unpacking the Significance", Society of Petroleum Engineers DOI 10.2118/217807-MS, Feb. 2024, 12 pages.

"U.S. Appl. No. 18/980,815 Final Office Action", Mar. 24, 2026, 13 pages.

"U.S. Appl. No. 18/428,868 Non-Final Office Action", May 12, 2026, 18 pages.

* cited by examiner

DRILL SPACE UNIT DEVELOPMENT BASED ON ENERGY DELIVERED TO FORMATION

BACKGROUND

The oil and gas industry uses well stimulation techniques to increase the transfer of hydrocarbon resources from a reservoir formation to a wellbore. Such stimulation typically relies on the introduction of a pressurized fracturing fluid into a wellbore. The pressurized fracturing fluid generates fractures downhole in the reservoir formation. As part of the process, a flow network, sometimes referred to as "frac iron," is constructed between a plurality of pumps and a wellhead of a wellbore. The flow network provides a path to deliver the pressurized fracturing fluid to the wellbore so the fracturing fluid may be used to generate and propagate fractures in the reservoir formation.

BRIEF DESCRIPTION OF THE DRAWINGS

The disclosure may be better understood by referencing the accompanying drawings.

Like reference numbers and designations in the various drawings indicate like elements.

DETAILED DESCRIPTION

Figure 1:
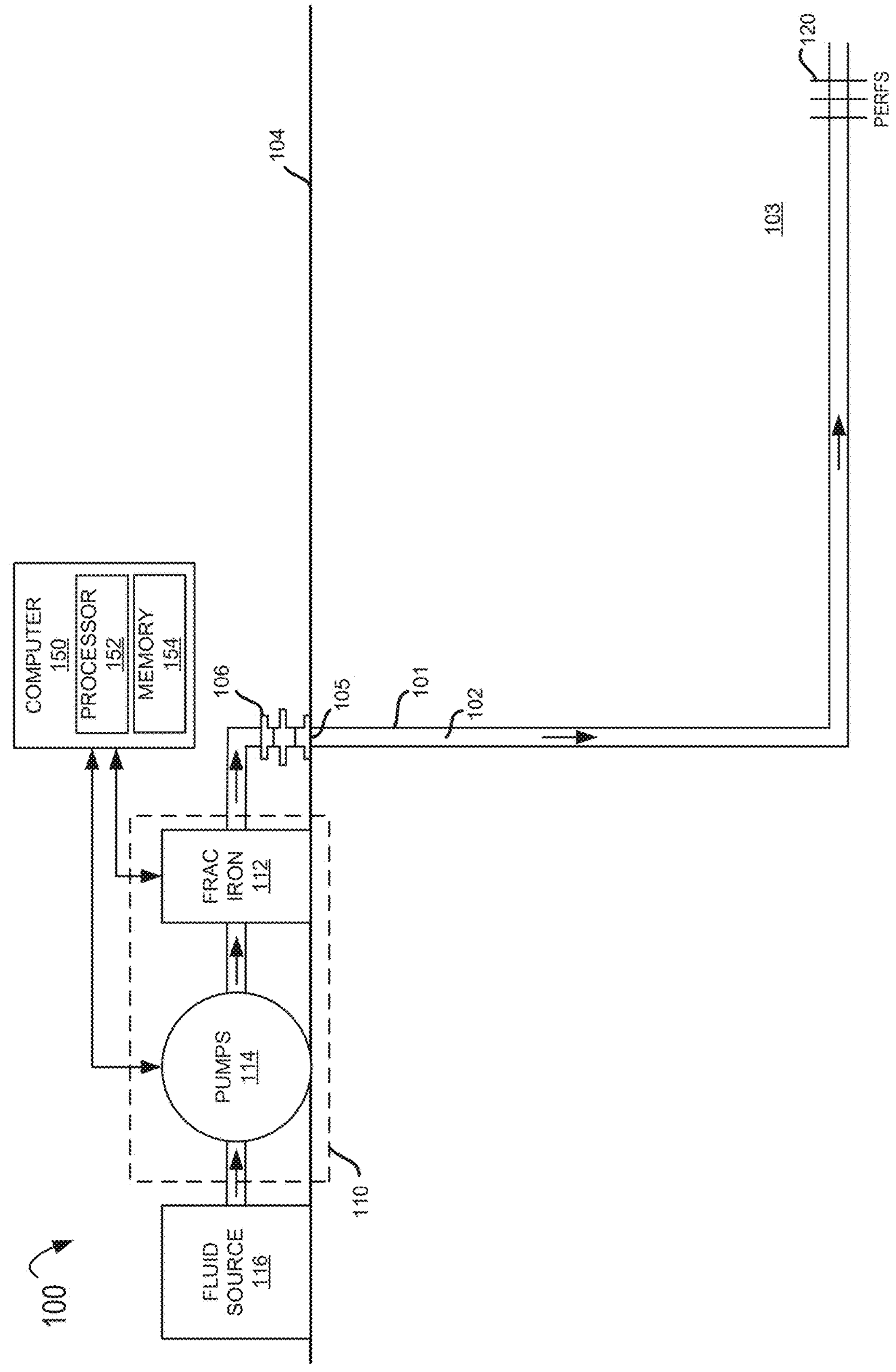
FIG. 1 illustrates an example well stimulation system, according to aspects of the present disclosure.

The description that follows includes example systems, methods, techniques, and program flows that embody embodiments of the disclosure. Unless otherwise specified, use of the terms "connect," "engage," "couple," "attach," or any other like term describing an interaction between elements is not meant to limit the interaction to a direct interaction between the elements and may also include an indirect interaction between the elements described. Unless otherwise specified, use of the terms "up," "upper," "upward," "uphole," "upstream," or other like terms shall be construed as generally away from the bottom, terminal end of a well; likewise, use of the terms "down," "lower," "downward," "downhole," or other like terms shall be construed as generally toward the bottom, terminal end of the well, regardless of the wellbore orientation. Use of any one or more of the foregoing terms shall not be construed as denoting positions along a perfectly vertical axis. In some instances, a part near the end of the well can be horizontal or even slightly directed upwards. Unless otherwise specified, use of the term "subterranean formation" shall be construed as encompassing both areas below exposed earth and areas below earth covered by water such as ocean or fresh water.

During hydraulic fracturing, energy transfer initiates with hydraulic horsepower (via positive displacement pumps) that injects a unit volume of an incompressible fluid, carrying a certain volume fraction of proppant, into the wellhead. The process applies energy through compression to convert a low-pressure volume to a high-pressure state. Surface energy consumption is defined as the integration of the horsepower deployed over time. Integrating the horsepower deployed over time provides total surface energy consumption for the entire hydraulic pumping duration.

As this unit volume traverses down the wellbore and into the formation, it is assisted by gravitational potential energy, which supplements its energy budget but must overcome the friction from the pipe, perforations, and tortuous near-wellbore zone, which act as energy losses. Subtracting energy losses from the total energy input results in the effective energy being delivered to the formation. The energy delivered by the unit of fluid may be expressed as:

$$\int P_{bh} dV = \int P_{wh} dV + \int P_{hydro} dV - \int P_{f,pipe} dV$$

That is, the effective energy delivered at the bottom of the wellbore is a summation of flow work done by the hydraulic horsepower and the gravitational potential energy variation due to change in elevation minus the frictional energy losses as the unit volume traverses the length of the pipe, through the perforations and into the near wellbore region. A portion of effective energy is transformed into fracture energy and expended in propagating tensile and shear cracks. The remainder gets stored in pressure energy, resulting in elevated reservoir pressure.

Effective energy may therefore be obtained based on the equation above, where the bottomhole pressure, after accounting for hydrostatic and frictional losses, is integrated with respect to slurry volume (or fluid volume). This method is accurate but involves increased computational time and resources. A second method is less accurate but much less cumbersome since it is based on the Instantaneous Shut-in pressure (ISIP) recorded at the end of every fracturing treatment.

Figure 7:
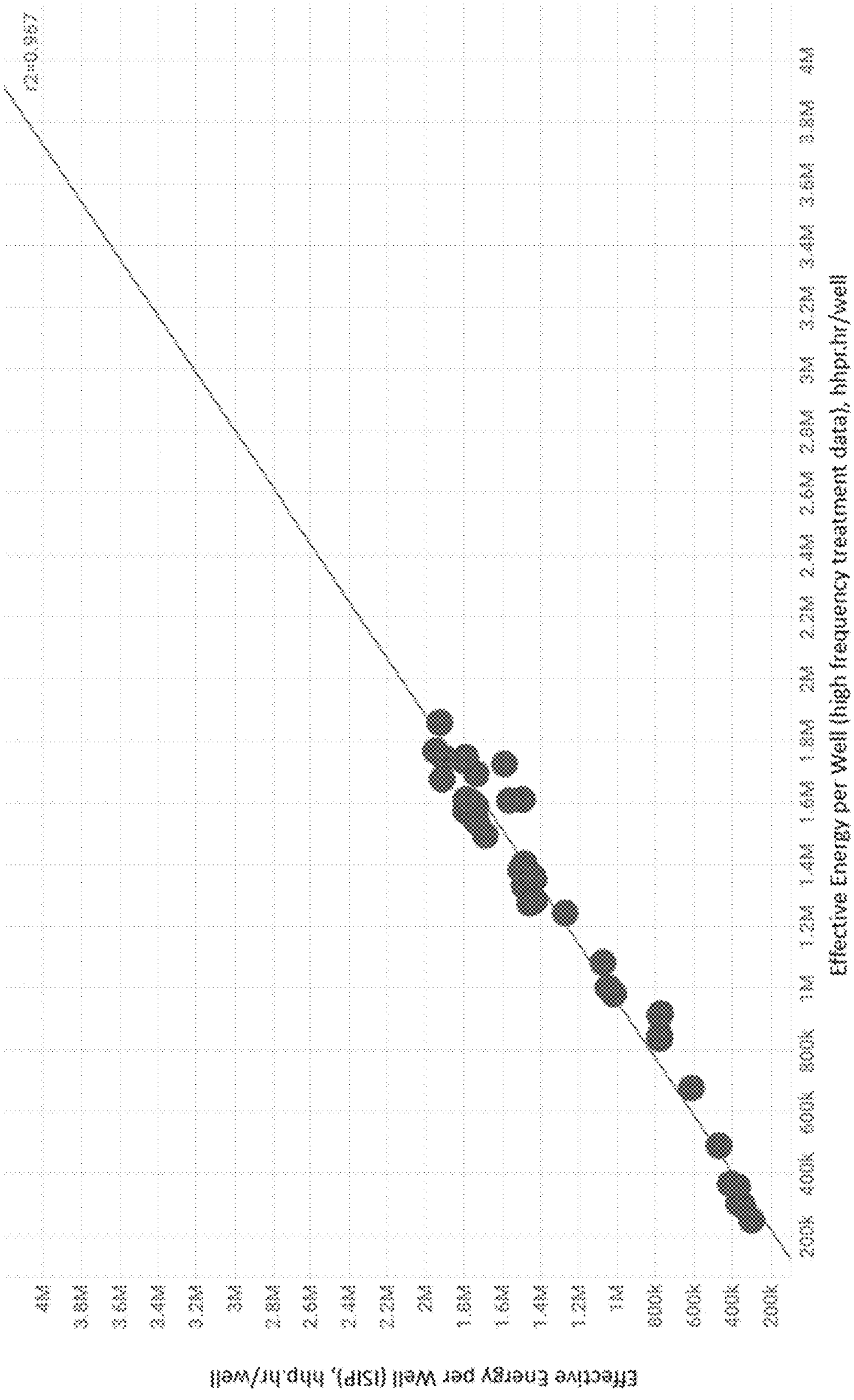
FIG. 7 is a graph illustrating analysis of effective energy per well across a variety of well, both calculated as a function of gains and losses and as a function of Instantaneous Shut-in pressure (ISIP) at the end of a treatment, according to aspects of the present disclosure.

FIG. 7 is a graph illustrating analysis of effective energy per well across a variety of well, both calculated as a function of gains and losses and as a function of Instantaneous Shut-in pressure (ISIP) at the end of a treatment, according to aspects of the present disclosure. As can be seen in the study of treatment results illustrated in FIG. 7, taking the product (y-axis in FIG. 7) of this ISIP with total slurry volume (or total fluid volume), over a treatment or an entire well, results in an effective energy estimate that is highly correlative to the effective energy derived from the first method (x-axis in FIG. 7).

It can be difficult to balance formation development costs versus formation production. It's not enough to simply look at the total slurry and fluid volume delivered to a formation without taking into account the dynamic conditions in which fracturing jobs occur. One should instead look at well stimulation as an exchange of energy for production (in any form) within the formation. In one example approach, the energy consumed on the surface may be directly correlated to fuel consumed by the hydraulic horsepower and by the horsepower operating cost. This correlation is direct given the fact that fuel and horsepower maintenance may be valued in units of energy (e.g., MMBtu or MWh). The effective energy delivered to formation, however, is different from surface energy consumed since the unit volume of slurry that is pumped from the surface down the wellbore, past the perforations and into formation undergoes a series of energy losses and energy gains before reaching the formation. Often, completion related variables are changed with no regard to the impact on total energy consumption and related cost since that relationship is not understood. Similarly, the lack of understanding of effective energy delivered to formation prevents operators from making informed decisions regarding drill space unit (DSU) production optimization.

Energy flow in a hydraulic fracturing system may be quantified by calculating surface energy used to pressurize fracturing fluid and to pump the pressurized fracturing fluid into a bore hole, adding the energy gains from hydrostatic pressure and subtracting the energy losses due to factors such as pipe friction, perforation friction, near well bore (NWB) losses due to tortuosity. A goal for the operator may then be to reduce surface energy usage while maintaining or maximizing the effective energy delivered to the formation. In one example approach, the ratio of effective energy in formation to operational cost is optimized for each well stimulation operation.

In one example approach, each operator may use the correlation between energy input and cost of energy (fuel cost and maintenance cost) to optimize effective energy delivered to his or her formation. In one such example approach, the operator increases effective energy delivered to the formation by reducing energy losses in the system. These losses are in the form of factors such as pipe friction, perforation friction and NWB friction (or tortuosity). Lowering any of these factors in the well stimulation system reduces the surface energy required for fracturing a given formation, reducing the quantity of fuel used for the operation and reducing the wear and tear on the pumps while maintaining the same effective energy at the formation. In one example approach, an operator seeks to maximize the ratio of effective energy into formation to operating cost.

Effective energy per acre has been proven to be highly correlative to production per acre for a DSU. Normalized energy metrics provide a means to improve asset development through production and cost optimization. In one example approach, the effective energy into formation is normalized on a DSU area basis (energy per acre), providing a metric that may be used in well spacing, well placement and frac order decisions. In another example approach, the effective energy into formation is normalized on a well lateral basis (energy per foot), providing a metric that may be used to optimize cluster and stage spacing.

In some example approaches, the well bore and associated equipment used to deliver pressurized fracturing fluid to a formation is in place when the well completion operator arrives at the site. In such example approaches, an operator is then limited to understanding the energy gains and losses in the system and optimizing the delivery of effective energy as a function of operational costs.

Defining and maximizing the effective energy delivered to formation while minimizing the operational costs of delivering fracturing fluid to a well bore allows operators to go beyond simply maximizing effective energy as a function of operating cost. In some example approaches, the well completion operator is involved in the design of the wellbore and related equipment. In such example approaches, the operator may modify the well bore and related equipment to reduce energy losses where possible. In one such example approach, the well stimulation system includes diagnostic tools that may be used to help understand not only the total effective energy delivered to formation but also its distribution once past the perforations.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Example Well Stimulation System

FIG. 1 illustrates an example well stimulation system, according to aspects of the present disclosure. A typical well stimulation system 100 includes one or more pumps and a flow network connecting the pumps through a wellbore to a reservoir formation. In operation, the flow network conveys pressurized fracturing fluid from the pumps to the reservoir formation. In general, fracturing fluids in well stimulation systems are injected into the wellbore at a high pressure in order to convey sufficient energy to a subterranean formation to cause fracturing in the formation. In some example approaches, well stimulation systems induce fluid pressures in a range of 3,000 to 20,000 pounds/square inch (psi) in the fluid injected into the wellbore with total slurry rate in the range of 10 to 200 barrels per min (bpm).

In the example shown in FIG. 1, well stimulation system 100 includes a frac iron configuration 110 connected through a wellbore 102 to a reservoir formation 103. Frac iron configuration 110 includes frac iron 112 and one or more pumps 114. In the example approach shown in FIG. 1, frac iron 112 receives pressurized fracturing fluid pumped by the one or more pumps 114 from fluid source 116 and conveys the received pressurized fluid through wellbore 102 to reservoir formation 103.

In some example approaches, wellbore 102 includes a casing 101 and an opening 105 at surface 104. In some such example approaches, the pressurized fracturing fluid passes through an isolation valve 106 before entering wellbore 102 at opening 105. In some example approaches, wellbore 102 further includes perforations 120 at certain locations in reservoir formation 103, the pressurized fracturing fluid passing through the perforations 120 to cause fractures in the reservoir location 103.

In one example approach, well stimulation system 100 includes a computer system 150. In one such example approach, computer system 150 includes a processor 152 and a memory 154. In one example approach, instructions are stored in memory 154 that, when executed by processor 152, allow the processor 152 to control the fracturing process. In one example approach the computer system 150 receives an effective energy model for energy loss in pressurized fracturing fluid passing into and through wellbore 102 to a reservoir formation 103 during hydraulic fracturing. The model may be used to determine effective energy delivered to the reservoir formation as a function of surface energy added to the fracturing fluid to raise the fracturing fluid to a high-pressure state; gravitational potential energy gains in the pressurized fracturing fluid as the fluid travels down to the reservoir formation; and energy losses in the pressurized fracturing fluid as the fluid travels down to the reservoir formation. In one example approach, an operator may use computer system 150 to apply the effective energy model to a selected reservoir formation and may select, based on the effective energy model, an operational cost for hydraulic fracturing of the selected reservoir formation. The operator may then use the computer system to control the one or more pumps 114 in frac iron configuration 110 to achieve the selected operational cost.

As noted above, surface energy consumption may be expressed as units of energy. For instance, surface energy consumption may be expressed as horsepower times hours, or horsepower hours, which may be considered a unit of energy. The surface energy used in treatment of one or more wells may be calculated by multiplying pressure, rate, and operational time for the duration of the well treatment to arrive at surface horsepower hours consumed. Surface horsepower hours consumed may also be calculated by integrating pressure with respect to volume pumped for the duration of the treatment. That is, surface energy may be determined as the energy input to elevate a unit volume of slurry (fluid containing a certain volume fraction of proppant) from a low-pressure state to a high-pressure state.

As the unit volume of slurry traverses down wellbore 102 it is met with assistance in the form of gravitational potential energy (hydrostatic pressure) and with resistance in the form of pipe friction. Additionally, when the unit of slurry flows past perforations 120 and near wellbore tortuous regions, the unit undergoes additional energy losses before reaching the formation. This relationship may be expressed via a derivation of Bernoulli's equation. Bernoulli's equation also adheres to conservation of energy. As a result, the pressure losses or gains may be represented in terms of energy if the individual terms of Bernoulli's equation are integrated with respect to volume.

This then becomes the backbone of hydraulic fracturing energy analyses, where the effective energy delivered to the formation may be calculated by adding gravitational potential energy to the surface energy component and subtracting all the energy loss contributions (pipe friction, perforations, tortuosity/near wellbore (NWB)). By understanding this energy system and applying completion strategies and technologies to reduce system losses such as pipe friction, perforation friction, near well bore losses or any other energy losses, one may lower surface energy consumption while maintaining or improving the effective energy delivered bottomhole. As the ratio of effective energy downhole to surface energy is maximized, so is the ratio of effective energy to operational cost maximized.

Effective energy may be normalized on a well lateral basis (energy per foot) or on a DSU area basis (energy per acre). Normalizing effective energy on a well lateral basis (energy per foot) helps provide a metric that is useful in optimizing cluster and stage spacing, which in turn impacts fracture space across a lateral. Normalizing effective energy on a DSU area basis (energy per acre) helps guide decisions concerning well spacing, well placement and frac order to maximize this normalized metric. Each of these metrics may readily be calculated on any given fracturing job and thus provide a means to make DSU development changes and completion design adjustments much quicker and with more insight than in the past.

Figure 2:
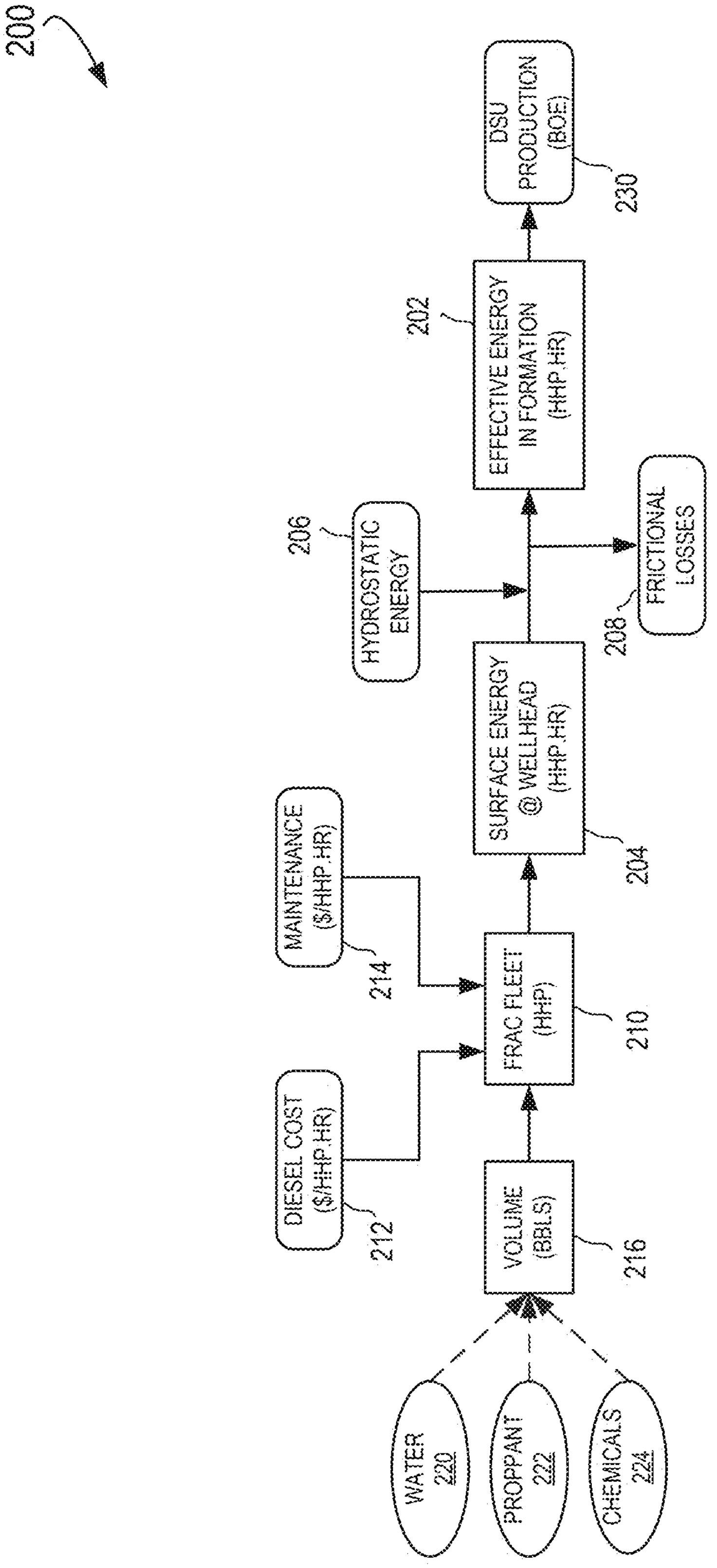
FIG. 2 is a flow diagram illustrating an example effective energy model of a diesel-powered well simulation system, according to aspects of the present disclosure.

FIG. 2 is a flow diagram illustrating an example effective energy model 200 of a diesel-powered well simulation system, according to aspects of the present disclosure. In one example approach, the effective energy model of FIG. 2 may be used for DSU production in a reservoir formation. In the example approach illustrated in FIG. 2, the effective energy 202 delivered to the formation (expressed as horsepower hours) is a function of surface energy 204 at the wellhead plus hydrostatic energy 206 minus energy losses 208 (such as losses due to friction). As noted above, surface energy 204 at the wellhead may be expressed by integrating pressure increase in the slurry at frac fleet 210 with respect to the volume of slurry 216 pumped by frac fleet 210 over the duration of a treatment, or by multiplying horsepower produced by frac fleet 210 over the time of the well treatment. As shown in FIG. 2, the slurry is a typically a combination of water 220 and a proppant 222 (such as sand). The slurry may also include chemicals 224 such as a friction reducer.

In some example approaches, DSU production 230 is monitored over the duration of the well treatment and used to calculate production versus operational cost. Such a calculation can be useful in identifying parameters such as how efficiently the frac fleet 210 delivered effective energy to the formation and production versus operational cost for the well treatment. In some example approaches, operational cost is a function of diesel cost 212 plus maintenance cost 214 (both expressed in $/horsepower hour). Similar calculations may be made for natural gas pumps, or for any such form of energy.

In another example approach, operational cost is a function of diesel cost 212 plus maintenance cost 214 (both expressed as total cost). In one example approach both operational costs and production are expressed as dollars, and the money from production is weighed against the operational cost to determine the efficiency of the treatment operation.

In another example approach, operational cost is based on the horsepower hours delivered to wellbore 102 (both expressed as total cost). In one example approach both operational costs and production are expressed as dollars, and the volume of production is weighed against the horsepower hours of the surface energy to determine the efficiency of the treatment operation.

Figure 3:
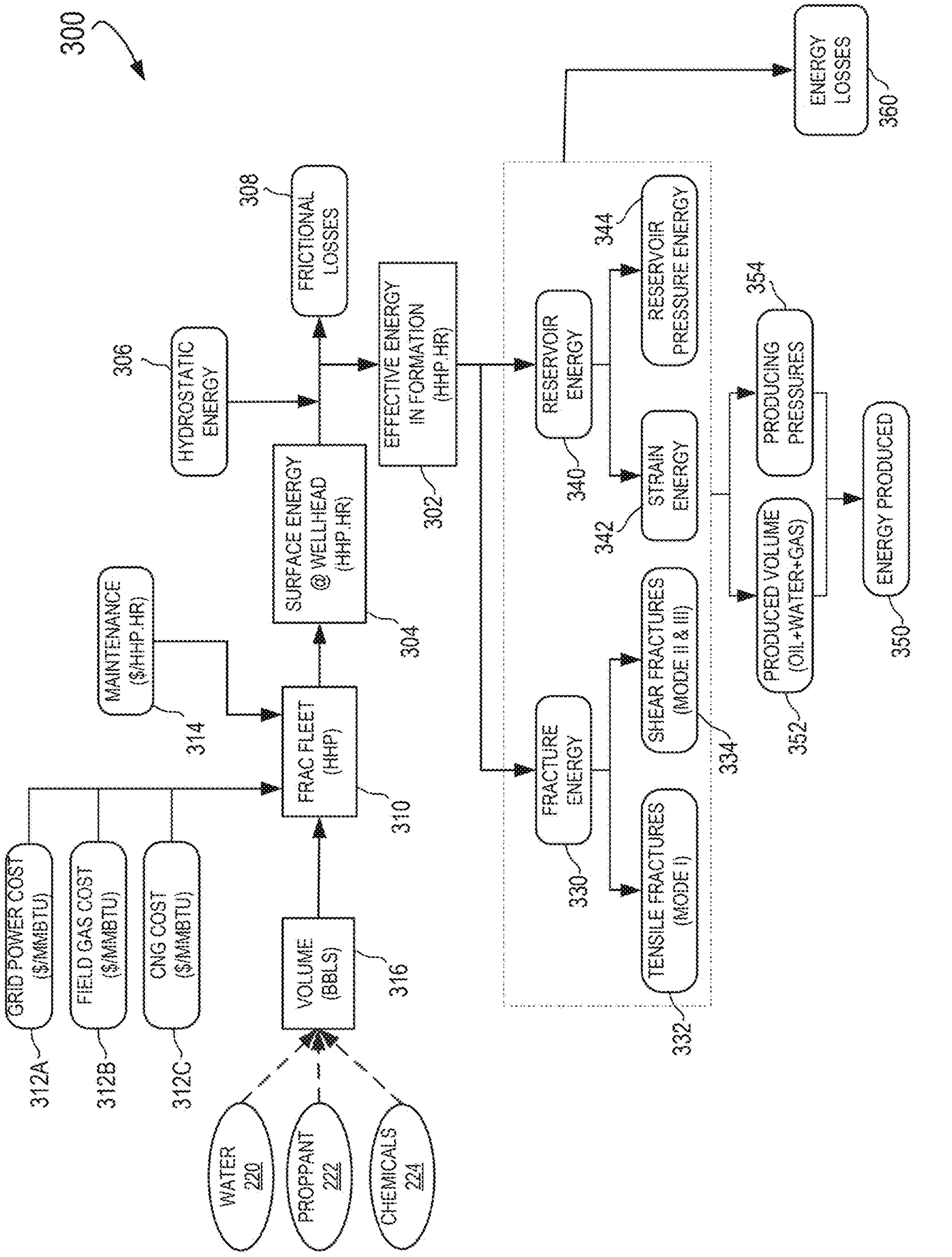
FIG. 3 is a flow diagram illustrating an example effective energy model of an alternative fuel powered well simulation system, according to aspects of the present disclosure.

FIG. 3 is a flow diagram illustrating an example effective energy model 300 of an alternative fuel powered well simulation system, according to aspects of the present disclosure. In one example approach, the effective energy model of FIG. 3 may be used for DSU production in a reservoir formation. In the example approach illustrated in FIG. 3, the effective energy 302 delivered to the formation (expressed as horsepower hours) is a function of surface energy 304 at the wellhead plus hydrostatic energy 306 minus frictional losses 308. As noted above, surface energy 304 at the wellhead may be expressed by integrating pressure increase in the slurry at frac fleet 310 with respect to the volume of slurry 316 pumped by frac fleet 310 over the duration of a treatment, or by multiplying horsepower produced by frac fleet 310 over the time of the well treatment. As shown in FIG. 3, the slurry is a typically a combination of water 220 and a proppant 222 (such as sand). The slurry may also include chemicals 224 such as a friction reducer.

As shown in FIG. 3, energy cost is a function of the fuel source, which includes one or more of grid power, field gas and compressed natural gas. The energy cost therefore includes one or more of grid power cost 312A, field gas cost 312B and compressed natural gas 312C (collectively "energy cost 312"). The energy needed to produce the requisite number of horsepower hours is provided by one or more energy sources, including grid power, as shown in FIG. 3.

In some example approaches, DSU production 350 is monitored over the duration of the well treatment and used to calculate production versus operational cost. In one example approach DSU production is determined as a function of energy produced and is a function of produced volume 352 of oil, water and gas and producing pressures 354. As noted in the discussion of FIG. 2 above, such a calculation may be useful in identifying, for example, how efficiently the frac fleet 310 delivered effective energy 302 to the formation and energy production 350 versus operational cost for the well treatment. In some example approaches, operational cost is a function of the cost 312 needed to produce the requisite number of horsepower hours plus maintenance cost 314 (also expressed in $/horsepower hour). In one example approach, calculations may be made for any of the fuels shown in FIG. 3, or for other fuels as needed.

In one example approach, historical pads with pumping data already available either with the operator of the reservoir formation or with the hydraulic energy provider, may be evaluated using this effective energy model to understand previous operational and design strategies and to diagnose energy inefficiencies that may have been present. This historical evaluation of fracturing jobs may then be used to guide decision making to improve operational cost per effective energy injected for current and future completion projects with that operator.

In one example approach, operational cost is a function of energy cost 312 plus maintenance cost 314 (both expressed as total cost). In one example approach both operational costs and production are expressed as dollars, and the money from production is weighed against the operational cost to determine the efficiency of the treatment operation.

In another example approach, operational cost is based on the maintenance cost 314 and the horsepower hours delivered to wellbore 102 (both expressed as total cost). In one example approach both operational costs and production are expressed as dollars, and the energy production (in horsepower hours) is weighed against the horsepower hours of the surface energy to determine the efficiency of the treatment operation.

In one example approach, effective energy in formation includes fracture energy 330 and reservoir energy 340. The effective energy delivered to the formation initiates and propagates fractures (fracture energy 330) while also increasing the reservoir energy 340 of the target formation. Fracture energy 330 includes energy needed to create tensile fractures (332) and energy needed to create shear fractures (334). Reservoir energy 340 includes strain energy 342 and reservoir pressure energy 344.

In one example approach, energy losses 360 are calculated by computer system 150 and supplied to the operator. In one such example approach, computer system 150 calculates energy losses by subtracting effective energy 302 from surface energy 304 (both expressed in horsepower hour). In some example approaches, the result of the subtraction is converted to cost in a currency value in a currency such as dollars.

Figure 4:
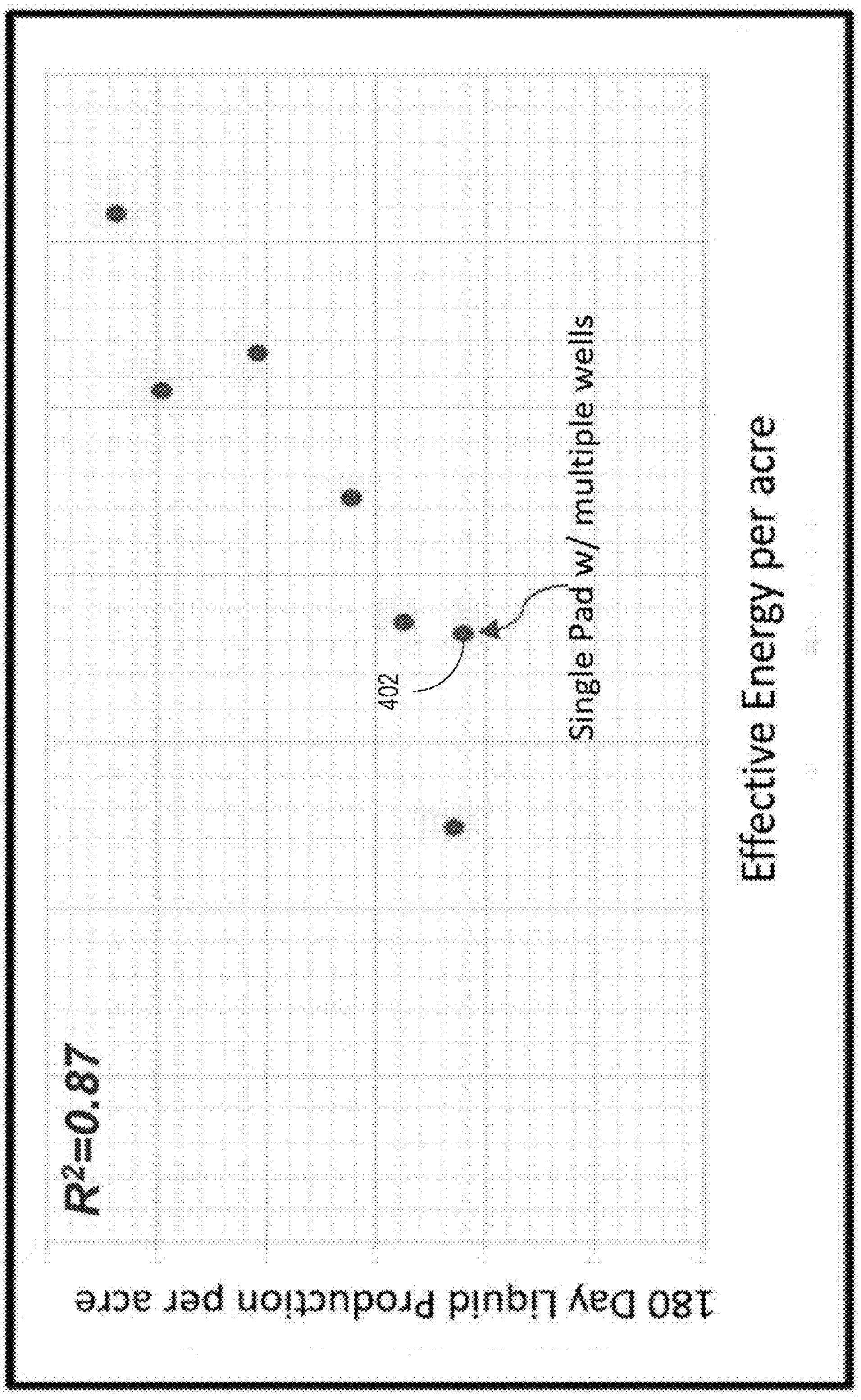
FIG. 4 is a graph illustrating DSU production per acre over a 180-day period vs effective energy delivered during hydraulic fracturing.

FIG. 4 is a graph illustrating DSU production per acre over a 180-day period vs effective energy delivered during hydraulic fracturing. In one example approach, each dot 402 represents results measured across multiple wells stimulated by one frac iron configuration 110. As can be seen in FIG. 4, each dot 402 falls roughly along a line (with $R^2=0.87$). Since, as can be seen in FIG. 4, effective energy per acre has been proven to be highly correlative to production per acre for a DSU, normalized energy metrics provide a means for improving asset development energy efficiency through production and cost optimization. Normalizing effective energy into formation 103 on a DSU area basis (energy per acre) may also be used to help guide decisions concerning well spacing, well placement and frac order to maximize this normalized metric.

By combining in-house pumping data and well production data available from public domain, a section-based approach cross plotting of total effective energy injected per unit area against production output per unit area shows a highly correlative positive relationship ($R^2>0.75$) across several basins in North America. This strong relationship not only reinforces the value of this energy analysis concept in hydraulic fracturing but also validates the overarching conservation of energy principle highlighting the usefulness of relating effective energy injected into formation to a direct increase in reservoir energy potential and, therefore, a greater potential for total productivity. Operators may rely on this relationship to tune their completion designs to minimize energy losses, which also lowers capital cost, while maximizing the effective energy delivered, improving productivity, and improving the rate of return on capital invested.

Figure 5:
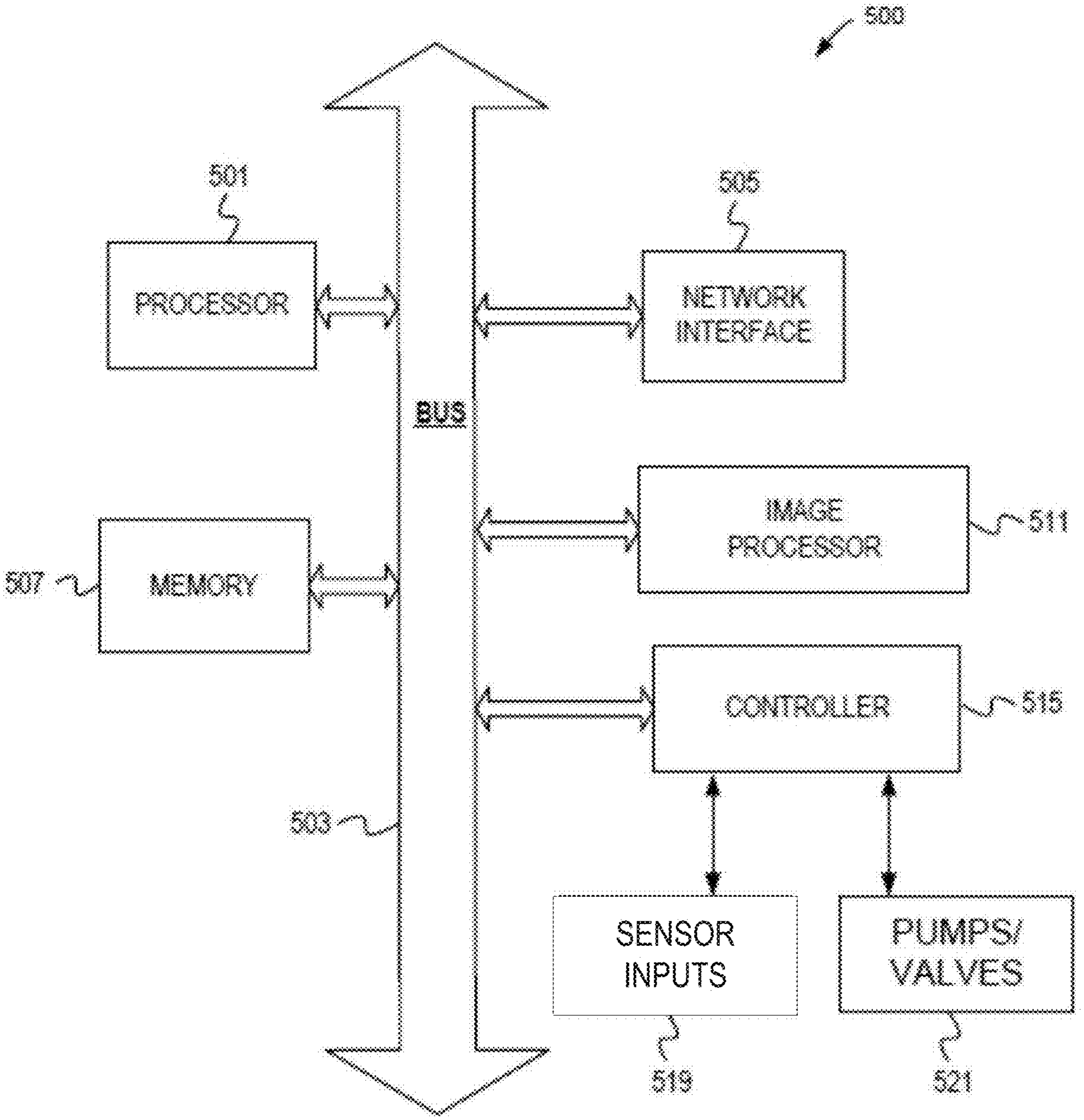
FIG. 5 illustrates a computer system that may be used as the computer system in FIG. 1.

FIG. 5 illustrates a computer system that may be used as the computer system 150 in FIG. 1. Computer system 500 may be employed to practice the concepts, methods, and techniques disclosed herein, and variations thereof. In one example approach, computer system 500 includes a plurality of components in electrical communication with each other, in some examples using a bus 503. The computing system 500 may include any suitable computer, controller, or data processing apparatus capable of being programmed to carry out the method and apparatus as further described herein.

In one example approach, computing system 500 may be a general-purpose computer, and may include a processor 501 (possibly including multiple processors, multiple cores, multiple nodes, and/or implementing multi-threading, etc.). In one such example approach, computer system 500 includes a memory 507. The memory 507 may be system memory (e.g., one or more of cache, SRAM, or DRAM) or any one or more of the possible realizations of machine-readable media. Computer system 500 also includes bus 503 (e.g., PCI, ISA, PCI-Express, etc.) and a network interface 505 (e.g., ethernet or Fiber Channel).

The computer may also include an image processor 511 and a controller 515. The controller 515 may control the different operations that can occur in response to data received at sensor inputs 519 and/or calculations based on data received from sensor inputs 519 (such as data from sensors used to sense, for instance, fracturing fluid pressure in frac iron 110 of FIG. 1) using any of the techniques described herein, and any equivalents thereof, to provide outputs to control pumps 114 and valves in frac iron 110. In some example approaches, controller 515 may communicate instructions to the appropriate equipment, devices, etc. to alter control number and/or the horsepower setting use by the pumps (such as pumps 114 in FIG. 1) that may be utilized in a fracturing procedure. Any one of the previously described functions may be partially (or entirely) implemented in hardware and/or on the processor 501. For example, the functions may be implemented with an application specific integrated circuit, in logic implemented in the processor 501, in a co-processor on a peripheral device or card, etc. Further, realizations may include fewer or additional components not illustrated in FIG. 5 (e.g., video cards, audio cards, additional network interfaces, peripheral devices, etc.). As illustrated in FIG. 5, the processor 501 and the network interface 505 are coupled to the bus 503. Although illustrated as also being coupled to the bus 503, the memory 507 may be coupled to the processor 501 only, to both processor 501 and bus 503 or to processor 501, image processor 511 and bus 503. Controller 515 may be coupled to sensor inputs 519 and to pumps 114 using any type of wired or wireless connection(s), and may receive data, such as measurement data, obtained by sensors inputs 519 or provided by the pumps 114 at pumps/valves 521. Sensor inputs 519 may include any of the sensors associated with a wellbore environment, including but not limited to the pressure sensors configured to output signals indicative of pressure level within a frac iron configuration. Controller 515 may include circuitry, such as analog-to-digital (A/D) converters and buffers that allow controller 515 to receive electrical signals directly from one or more of sensor inputs 519.

Processor 501 may be configured to execute instructions that provide control over the pressurized fluid fracturing procedures described in this disclosure, and over any equivalents thereof. For example, processor 501 may control operations of one or more pumps 114 being utilized to pressurize a frac iron configuration as part of a fracturing procedure. Control of pumps may include determining a set of predefined pump configurations, wherein a particular one of the predefined pump configurations are assigned to be used during each of a plurality of pressure testing cycles, and providing output signal, for example to controller(s) located at the pumps 114, to configure and control the operations of the pumps during the duration of the procedure according to the predefined pump configuration that is to be applied to that particular pressure testing cycle.

With respect to computing system 500, basic features here may easily be substituted for improved hardware or firmware arrangements as they are developed. In some examples, memory 507 includes non-volatile memory and can be a hard disk or other types of computer readable media which can store data that are accessible by a computer, such as magnetic cassettes, flash memory cards, solid state memory devices, digital versatile disks (DVDs), cartridges, RAM, ROM, a cable containing a bit stream, and hybrids thereof.

It will be understood that one or more blocks of the flowchart illustrations and/or block diagrams, and combinations of blocks in the flowchart illustrations and/or block diagrams, may be implemented by program code. The program code may be provided to a processor of a general-purpose computer, special purpose computer, or other programmable machine or apparatus. As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine. While depicted as a computing system 400 or as a general-purpose computer, some embodiments can be any type of device or apparatus to perform operations described herein.

Example Operations

Figure 6:
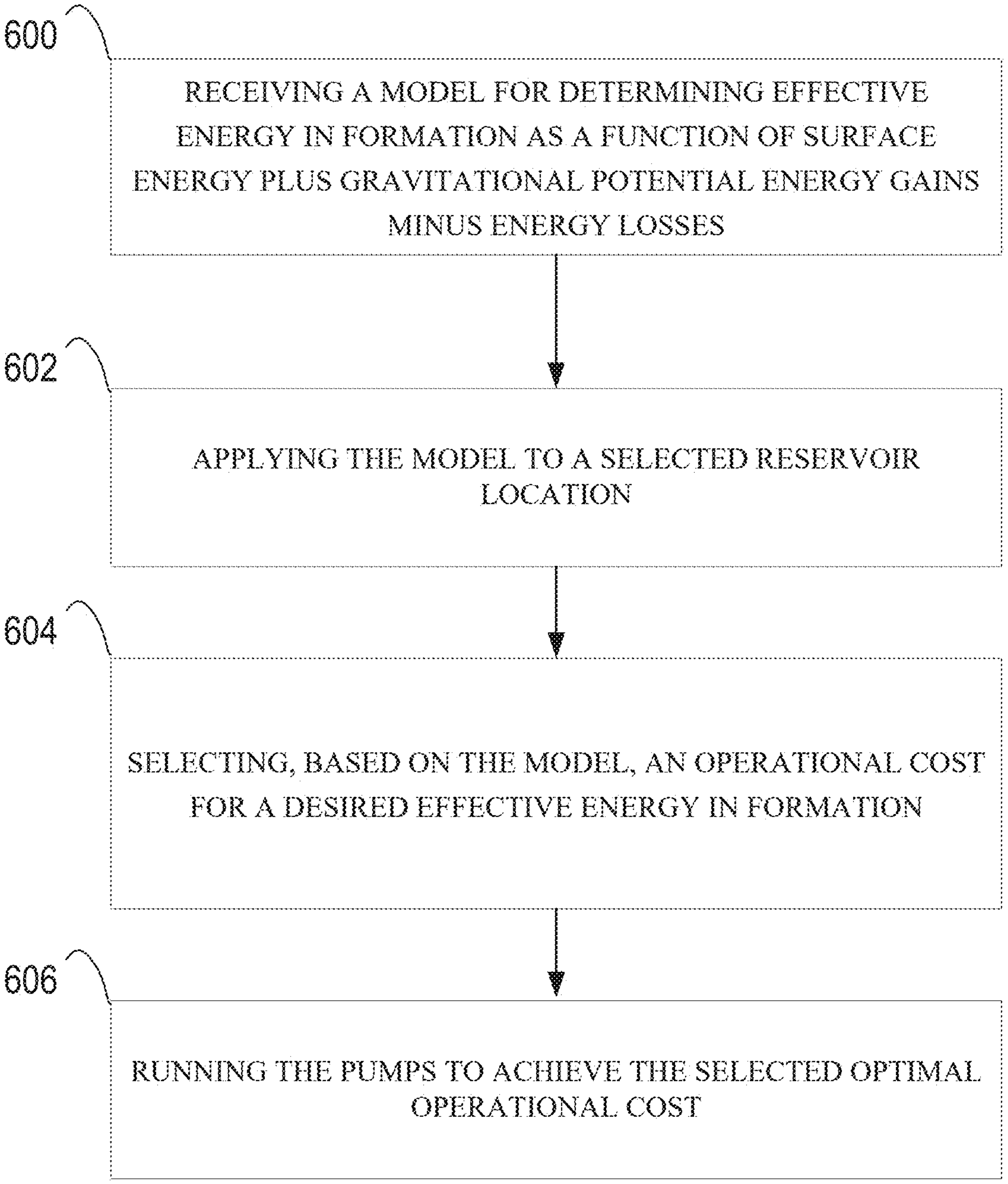
FIG. 6 is a flowchart illustrating a method of executing a fracturing procedure in a reservoir formation, according to aspects of the present disclosure.

FIG. 6 is a flowchart illustrating a method of executing a fracturing procedure in a reservoir formation, according to aspects of the present disclosure. In the flowchart of FIG. 6, a method includes receiving a model for determining effective energy in the reservoir formation as a function of surface energy plus potential energy gains minus energy losses (600). The operator applies the model to a selected reservoir location (602). The operator then selects, based on the model, an operating cost for a desired effective energy in formation (604) and runs the pumps at the selected operating cost to achieve the desired effective energy in the reservoir formation (606).

What is described herein is a method for engineers to evaluate the process of hydraulic fracturing through the lens of energy transfer, quantifying energy transformation into various forms on its path from surface equipment into fractures. Relating energy to each of the varying facets of completion operations, optimal solutions can be derived quickly based on changing conditions and with system knowledge of the tradeoffs being made.

For instance, one might be tempted to reduce the use of friction reducer additives to save the cost of such additives. Friction reducer (FR) additives, when injected into the slurry stream while pumping, reduce the friction due to turbulence and tubular drag as the fluid traverses through the wellbore. Friction reduction is essential in allowing a much greater flow rate throughput while lowering the horsepower usage overall and keeping below the maximum pressure constraints. Reducing FR concentrations to lower usage is a common cost saving practice, but this decision may be more costly than if a higher FR concentration were maintained throughout the job.

A test in a two-mile lateral indicated that halving the FR concentration increased the pipe friction about 168 k hhp·hr. If FR costs $7 per gallon and the total FR saved per well is 6,050 gallons, then FR cost savings of about $42 k per well are realized. However, with increased friction pressures, surface horsepower utilization increases, which positively correlates to fuel usage. So for this scenario, an increase in energy consumption by 168 k hhp·hr will surge the total fuel cost by $59 k, assuming a conversion of 70 gallons of diesel per 1000 hhp·hr and $5/gallon of diesel. In this case, the impact of reducing friction reducer, in turn, backfires with an increase in $17 k of cost per well. If the horsepower cost is $600 per 1000 hhp·hr, the reduction in friction reducer results in an additional $101 k cost per well.

While the oil and gas industry remains highly focused on capital efficiency, the effective energy metric enables near-instantaneous optimization of development costs rather than approaches that iterate on 6 month or one year production performance. Time and capital may then be invested in technologies and processes that either maximize effective energy and resultant productivity or minimize energy losses in the system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and the described program components and systems can generally be integrated together in a single software product or packaged into multiple software products. Additionally, other implementations are within the scope of the following claims. In some cases, the actions recited in the claims can be performed in a different order and still achieve desirable results.

EXAMPLE EMBODIMENTS

Embodiment #1: A method, comprising receiving an effective energy model for energy loss in pressurized fracturing fluid passing into and through a wellbore to a reservoir formation during hydraulic fracturing, the model determining effective energy delivered to the reservoir formation as a function of surface energy added to the fracturing fluid to raise the fracturing fluid to a high-pressure state; gravitational potential energy gains in the pressurized fracturing fluid as the fluid travels down to the reservoir formation; and energy losses in the pressurized fracturing fluid as the fluid travels down to the reservoir formation; applying the effective energy model to a selected reservoir formation; selecting, based on the effective energy model, an operational cost for hydraulic fracturing of the selected reservoir formation; and controlling one or more pumps in a frac iron configuration to achieve the selected operational cost.

Embodiment #2: The method of Embodiment #1, wherein the operational cost is a function of energy cost and maintenance cost incurred in pressurizing the pressurized fracturing fluid.

Embodiment #3: The method of Embodiment #1, wherein selecting an operational cost includes determining an operational cost that maximizes effective energy delivered to the reservoir formation per unit of operating cost.

Embodiment #4: The method of Embodiment #3, wherein selecting an operational cost further includes adjusting the operational cost during operation to reflect changes in one or more reservoir formation conditions.

Embodiment #5: The method of Embodiment #1, wherein selecting an operational cost includes determining an operational cost that maximizes production per unit of operating cost.

Embodiment #6: The method of Embodiment #5, wherein selecting an operational cost further includes adjusting the operational cost during operation to reflect changes in one or more reservoir formation conditions.

Embodiment #7: The method of Embodiment #1, wherein applying the model includes estimating effective energy delivered to the selected reservoir formation as a product of a recorded Instantaneous Shut-in pressure (ISIP) and a total fluid volume of the fluid delivered to the selected reservoir formation during hydraulic fracturing.

Embodiment #8: The method of Embodiment #1, wherein applying the model includes adapting the model to one or more reservoir formation conditions, including pipe friction, perforation friction and tortuosity/near well bore (NWB).

Embodiment #9: The method of Embodiment #8, wherein applying the model includes adapting the model to reflect an evaluation of previous hydraulic fracturing jobs.

Embodiment #10: A well stimulation system comprising one or more pumps, the pumps configured to pressurize fracturing fluid received from a fluid source and to direct the pressurized fracturing fluid down a wellbore to a reservoir formation and a computer system having a processor and a memory, the memory including instructions that, when executed by the processor, cause the processor to receive an effective energy model for energy loss in pressurized fracturing fluid passing into and through a wellbore to a reservoir formation during hydraulic fracturing, the model determining effective energy delivered to the reservoir formation as a function of surface energy added to the fracturing fluid to raise the fracturing fluid to a high-pressure state; gravitational potential energy gains in the pressurized fracturing fluid as the fluid travels down to the reservoir formation; and energy losses in the pressurized fracturing fluid as the fluid travels down to the reservoir formation; apply the effective energy model to a selected reservoir formation; select, based on the effective energy model, an operational cost for hydraulic fracturing of the selected reservoir formation; and control the pumps to achieve the selected operational cost.

Embodiment #11: The system of Embodiment #10, wherein the instructions that, when executed by the processor, cause the processor to select an operational cost include instructions that, when executed by the processor, cause the processor to determine an operational cost that maximizes effective energy delivered to the reservoir formation per unit of operating cost.

Embodiment #12: The system of Embodiment #10, wherein the instructions that, when executed by the processor, cause the processor to select an operational cost include instructions that, when executed by the processor, cause the processor to adjust the operational cost during operation to reflect changes in one or more reservoir formation conditions.

Embodiment #13 The system of Embodiment #10, wherein the instructions that, when executed by the processor, cause the processor to select an operational cost include instructions that, when executed by the processor, cause the processor to determine an operational cost that maximizes production per unit of operating cost.

Embodiment #14: The system of Embodiment #13, wherein the instructions that, when executed by the processor, cause the processor to select an operational cost include instructions that, when executed by the processor, cause the processor to adjust the operational cost during operation to reflect changes in one or more reservoir formation conditions.

Embodiment #15: The system of Embodiment #10, wherein the instructions that, when executed by the processor, cause the processor to apply the effective energy model to a selected reservoir formation include instructions that, when executed by the processor, cause the processor to adapt the model to one or more reservoir formation conditions, including depth of the selected reservoir formation.

Embodiment #16: The system of Embodiment #10, wherein the instructions that, when executed by the processor, cause the processor to apply the effective energy model to a selected reservoir formation include instructions that, when executed by the processor, cause the processor to adapt the model to one or more reservoir formation conditions, including pipe friction, perforation friction and tortuosity/near well bore (NWB).

Embodiment #17: The system of Embodiment #10, wherein the instructions that, when executed by the processor, cause the processor to apply the effective energy model to a selected reservoir formation include instructions that, when executed by the processor, cause the processor to adapt the model to reflect an evaluation of previous hydraulic fracturing jobs.

Embodiment #18: A non-transitory computer readable medium storing instructions that, when executed by a computer cause the computer to receive an effective energy model for energy loss in pressurized fracturing fluid passing into and through a wellbore to a reservoir formation during hydraulic fracturing, the model determining effective energy delivered to the reservoir formation as a function of surface energy added to the fracturing fluid to raise the fracturing fluid to a high-pressure state; gravitational potential energy gains in the pressurized fracturing fluid as the fluid travels down to the reservoir formation; and energy losses in the pressurized fracturing fluid as the fluid travels down to the reservoir formation; apply the effective energy model to a selected reservoir formation; and select, based on the effective energy model, an operational cost for hydraulic fracturing of the selected reservoir formation.

Embodiment #19: The computer readable medium of Embodiment #18, wherein the instructions that, when executed by the computer, cause the computer to apply the effective energy model to a selected reservoir formation include instructions that, when executed by the computer, cause the computer to determine an operational cost that maximizes one or more of effective energy delivered to the reservoir formation per unit of operating cost and production per unit of operating cost.

Embodiment #20: The computer readable medium of Embodiment #18, wherein the instructions that, when executed by the computer, cause the computer to apply the effective energy model to a selected reservoir formation include instructions that, when executed by the computer, cause the computer to adapt the model to one or more reservoir formation conditions, including pipe friction, perforation friction and tortuosity/near well bore (NWB).

What is claimed is:

1. A method, comprising:

receiving an effective energy model for energy loss in pressurized fracturing fluid passing into and through a wellbore to a reservoir formation during hydraulic fracturing, the model determining effective energy delivered to the reservoir formation as a function of:

surface energy added to the fracturing fluid to raise the fracturing fluid to a high-pressure state;

gravitational potential energy gains in the pressurized fracturing fluid as the fluid travels down to the reservoir formation; and energy losses in the pressurized fracturing fluid as the fluid travels down to the reservoir formation;

applying the effective energy model to a selected reservoir formation;

selecting, based on the effective energy model, an operational cost for hydraulic fracturing of the selected reservoir formation; and controlling one or more pumps in a frac iron configuration to achieve the selected operational cost.

2. The method of claim 1, wherein the operational cost is a function of energy cost and maintenance cost incurred in pressurizing the pressurized fracturing fluid.

3. The method of claim 1, wherein selecting an operational cost includes determining an operational cost that maximizes effective energy delivered to the reservoir formation per unit of operating cost.

4. The method of claim 3, wherein selecting an operational cost further includes adjusting the operational cost during operation to reflect changes in one or more reservoir formation conditions.

5. The method of claim 1, wherein selecting an operational cost includes determining an operational cost that maximizes production per unit of operating cost.

6. The method of claim 5, wherein selecting an operational cost further includes adjusting the operational cost during operation to reflect changes in one or more reservoir formation conditions.

7. The method of claim 1, wherein applying the model includes estimating effective energy delivered to the selected reservoir formation as a product of a recorded Instantaneous Shut-in pressure (ISIP) and a total fluid volume of the fluid delivered to the selected reservoir formation during hydraulic fracturing.

8. The method of claim 1, wherein applying the model includes adapting the model to one or more reservoir formation conditions, including pipe friction, perforation friction and tortuosity/near well bore (NWB).

9. The method of claim 1, wherein applying the model includes adapting the model to reflect an evaluation of previous hydraulic fracturing jobs.

10. A well stimulation system, comprising:

one or more pumps, the pumps configured to pressurize fracturing fluid received from a fluid source and to direct the pressurized fracturing fluid down a wellbore to a reservoir formation; and a computer system having a processor and a memory, the memory including instructions that, when executed by the processor, cause the processor to:

receive an effective energy model for energy loss in pressurized fracturing fluid passing into and through a wellbore to a reservoir formation during hydraulic fracturing, the model determining effective energy delivered to the reservoir formation as a function of:

surface energy added to the fracturing fluid to raise the fracturing fluid to a high-pressure state;

gravitational potential energy gains in the pressurized fracturing fluid as the fluid travels down to the reservoir formation; and energy losses in the pressurized fracturing fluid as the fluid travels down to the reservoir formation;

apply the effective energy model to a selected reservoir formation;

select, based on the effective energy model, an operational cost for hydraulic fracturing of the selected reservoir formation; and control the pumps to achieve the selected operational cost.

11. The system of claim 10, wherein the instructions that, when executed by the processor, cause the processor to select an operational cost include instructions that, when executed by the processor, cause the processor to determine an operational cost that maximizes effective energy delivered to the reservoir formation per unit of operating cost.

12. The system of claim 11, wherein the instructions that, when executed by the processor, cause the processor to select an operational cost include instructions that, when executed by the processor, cause the processor to adjust the operational cost during operation to reflect changes in one or more reservoir formation conditions.

13. The system of claim 10, wherein the instructions that, when executed by the processor, cause the processor to select an operational cost include instructions that, when executed by the processor, cause the processor to determine an operational cost that maximizes production per unit of operating cost.

14. The system of claim 13, wherein the instructions that, when executed by the processor, cause the processor to select an operational cost include instructions that, when executed by the processor, cause the processor to adjust the operational cost during operation to reflect changes in one or more reservoir formation conditions.

15. The system of claim 10, wherein the instructions that, when executed by the processor, cause the processor to apply the effective energy model to a selected reservoir formation include instructions that, when executed by the processor, cause the processor to adapt the model to one or more reservoir formation conditions, including depth of the selected reservoir formation.

16. The system of claim 10, wherein the instructions that, when executed by the processor, cause the processor to apply the effective energy model to a selected reservoir formation include instructions that, when executed by the processor, cause the processor to adapt the model to one or more reservoir formation conditions, including pipe friction, perforation friction and tortuosity/near well bore (NWB).

17. The system of claim 10, wherein the instructions that, when executed by the processor, cause the processor to apply the effective energy model to a selected reservoir formation include instructions that, when executed by the processor, cause the processor to adapt the model to reflect an evaluation of previous hydraulic fracturing jobs.

18. A non-transitory computer readable medium storing instructions that, when executed by a computer cause the computer to:

receive an effective energy model for energy loss in pressurized fracturing fluid passing into and through a wellbore to a reservoir formation during hydraulic fracturing, the model determining effective energy delivered to the reservoir formation as a function of:

surface energy added to the fracturing fluid to raise the fracturing fluid to a high-pressure state;

gravitational potential energy gains in the pressurized fracturing fluid as the fluid travels down to the reservoir formation; and energy losses in the pressurized fracturing fluid as the fluid travels down to the reservoir formation;

apply the effective energy model to a selected reservoir formation;

select, based on the effective energy model, an operational cost for hydraulic fracturing of the selected reservoir formation; and inject fracturing fluid into the selected reservoir formation, the fracturing fluid pressurized to achieve the selected operational cost.

19. The computer readable medium of claim 18, wherein the instructions that, when executed by the computer, cause the computer to apply the effective energy model to a selected reservoir formation include instructions that, when executed by the computer, cause the computer to determine an operational cost that optimizes one or more of effective energy delivered to the reservoir formation per unit of operating cost and production per unit of operating cost.

20. The computer readable medium of claim 18, wherein the instructions that, when executed by the computer, cause the computer to apply the effective energy model to a selected reservoir formation include instructions that, when executed by the computer, cause the computer to adapt the model to one or more reservoir formation conditions, including pipe friction, perforation friction and tortuosity/near well bore (NWB).

* * * * *